United States Patent
Ji et al.

(10) Patent No.: US 11,100,773 B1
(45) Date of Patent: Aug. 24, 2021

(54) LOCKER SYSTEM FOR CONDITION-BASED STORING AND RETURN OF AN ITEM

(71) Applicant: Capital One Services, LLC, McLean, VA (US)

(72) Inventors: Jason Ji, McLean, VA (US); Lukiih Cuan, McLean, VA (US); Salik Shah, McLean, VA (US); Negar Kalbasi, McLean, VA (US); Allison Rosenberg, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/908,701

(22) Filed: Jun. 22, 2020

(51) Int. Cl.
| | |
|---|---|
| *G08B 13/14* | (2006.01) |
| *G07C 9/00* | (2020.01) |
| *G06Q 30/06* | (2012.01) |
| *G06K 9/46* | (2006.01) |
| *G06T 7/73* | (2017.01) |

(52) U.S. Cl.
CPC ....... *G08B 13/1481* (2013.01); *G06K 9/4609* (2013.01); *G06K 9/4652* (2013.01); *G06Q 30/0645* (2013.01); *G06T 7/73* (2017.01); *G07C 9/00896* (2013.01); *G08B 13/1472* (2013.01)

(58) Field of Classification Search
CPC .. G08B 13/1481; G08B 13/1472; G06T 7/73; G06K 9/4609; G06K 9/4652; G06Q 30/0645; G07C 9/00896

USPC ....................................................... 340/568.1
See application file for complete search history.

(56) References Cited

U.S. PATENT DOCUMENTS

| | | | | |
|---|---|---|---|---|
| 8,253,533 | B2 * | 8/2012 | Jones | G07C 9/27 340/5.61 |
| 10,043,151 | B1 * | 8/2018 | Zhu | G06Q 10/0836 |
| 10,157,362 | B1 * | 12/2018 | Johansson | G06Q 30/0633 |
| 2016/0133075 | A1 * | 5/2016 | Amdahl | G07C 9/00571 340/5.51 |
| 2018/0061157 | A1 * | 3/2018 | Zielkowski | A45F 5/02 |
| 2020/0364650 | A1 * | 11/2020 | Kernick | A61B 50/18 |

* cited by examiner

*Primary Examiner* — Kerri L McNally
(74) *Attorney, Agent, or Firm* — Pillsbury Winthrop Shaw Pittman LLP

(57) ABSTRACT

In certain embodiments, condition-based storing and return of an item associated with a user may be facilitated via a locker system. In some embodiments, attribute information indicating attributes of an item placed in the locker system may be obtained, and the attribute information may be processed to determine a categorization of the item. In response to the categorization satisfying one or more categorization conditions, product/service information related to a product or service may be provided for presentation to the user. In response to receiving user acceptance of the product or service, an item return condition may be assigned to the item. In response to the user satisfying the item return condition, access rights to the item may be enabled for the user.

20 Claims, 5 Drawing Sheets

LOCKER SYSTEM FOR CONDITION-BASED STORING AND RETURN OF AN ITEM

TECHNICAL FIELD

The disclosed embodiments relate to a locker system for storing an item, including, condition-based storing and return of an item.

BACKGROUND

Some institutions offer a safe holding area (e.g., a locker) where individuals can store their physical items safely. Typically, an individual must be accompanied by a representative of such an institution to gain access to the locker area and unlock the locker, after which the individual stores or retrieves a physical item and re-locks the locker. Such traditional locker systems do not incorporate features that enable additional products or services for an individual in connection with the individual's storage of physical items. These and other drawbacks exist.

SUMMARY

Aspects of the disclosed embodiments relate to methods, apparatuses, and/or systems for condition-based storing and return of an item.

In some embodiments, a locker system may include a locking mechanism (e.g., a mechanical lock, an electric strike lock, a magnetic lock, etc.) may be activated in response to a physical item being placed in the locker system to secure the physical item within the locker system. As an example, upon the activation of the locking mechanism, a door, window, or other component of the locker system may be locked to prevent access to the item. Attribute information (e.g., a weight, a shape, a color, an identification code, a configuration, or other attributes) may be obtained via one or more sensors of the locker system. The attribute information may be processed based on reference item information related to one or more reference items to determine a categorization of the physical item (e.g., a type of the physical item, a value of the physical item, or other categorizations). In some embodiments, feature vectors related to the physical attributes of the physical item may extracted from one or more images of the physical item, and the extracted feature vectors may be processed based on reference feature vectors of the reference items to determine the categorization of the physical item.

In some embodiments, a determination of whether the categorization of the physical item satisfies one or more categorization conditions (e.g., an item type that is accepted for storage, a value is in a specified value range, or other conditions) may be performed. In response to determining that the categorization conditions are not satisfied, the locking mechanism may be deactivated to provide user access to the physical item. However, in response to determining that the categorization of the physical item satisfies the categorization conditions, product/service information related to a product or service may be provided for presentation to the user while maintaining the activation of the locking mechanism.

In some embodiments, upon presenting the product/service information related to a product or service, the user may accept or reject the presented product or service. If the user rejects the product/service, the locking mechanism may be deactivated to provide user access to the physical item. However, in response to receiving a user acceptance of the product/service, one or more item return conditions may be assigned to the physical item, and user access to the item may be restricted at least until the item return condition is satisfied.

In some embodiments, in response to the user satisfying the item return condition, access rights to the physical item may be enabled for the user. Additionally, or alternatively, unlock information may be provided to the user in response to the access rights being enabled for the user. The user may, for example, use the unlock information (e.g., a PIN, password, or other unlock information) to access the physical item stored in the locker system (e.g., by providing the unlock information to the locker system or a system in communication with the locker system). For example, the user may input the unlock information to the locker system (or other associated system) via a user interface of the locker system or a user interface of a client device of the user. Upon verifying that the item return condition is satisfied and the unlock information is correct, the locker system may deactivate the locking mechanism to unlock the locker system to provide user access to the physical item.

In some embodiments, the locker system may include one or more lockers, and the physical item may be stored in one of the lockers. In some embodiments, the physical item may be initially placed in one locker (e.g., to determine the categorization of the physical item) and later moved to another locker for storage (e.g., upon the user accepting the product/service). For example, the physical item may be initially placed in a first locker that has one or more sensors (e.g., for facilitating determination of the categorization) and may then be moved to a second locker that does not have such sensors.

Various other aspects, features, and advantages of the invention will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
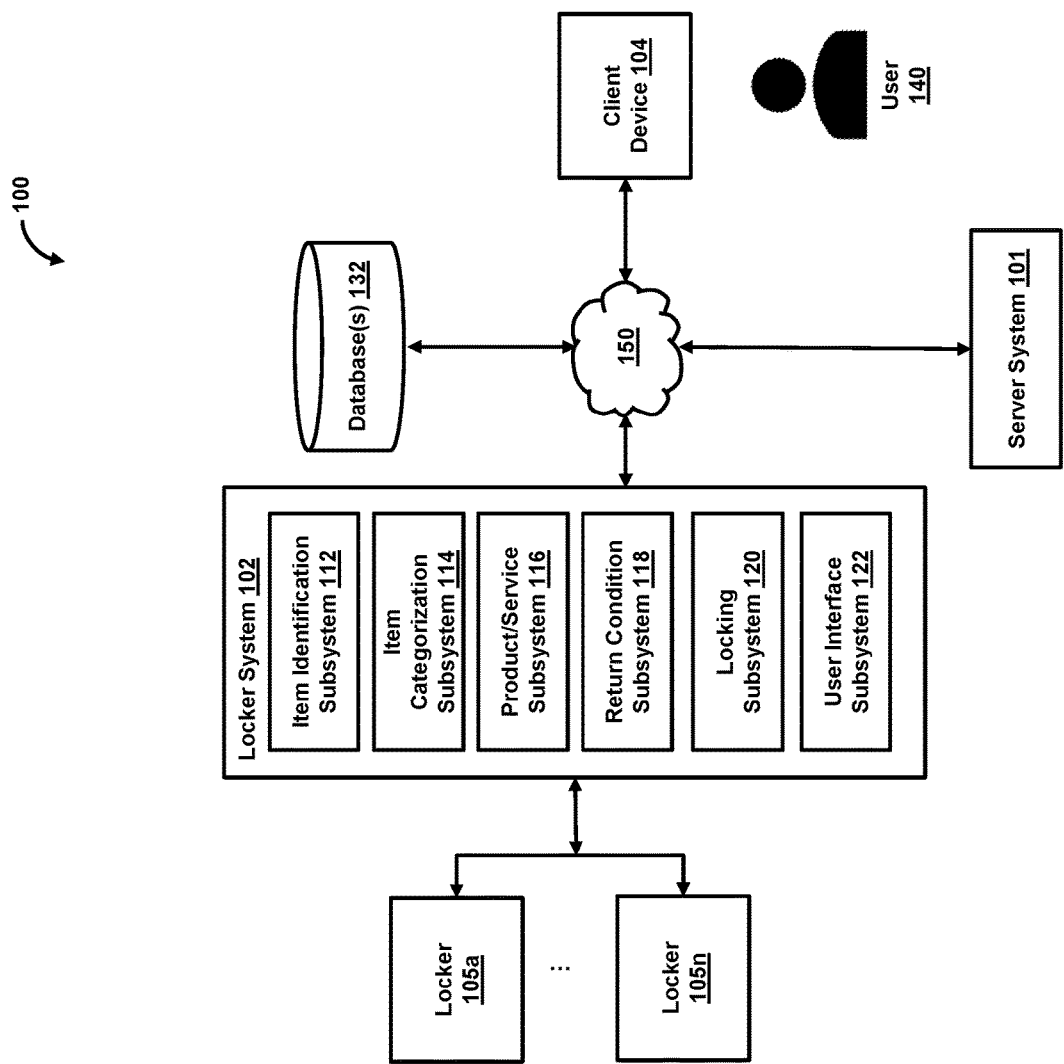
FIG. 1 shows a system for facilitating condition-based storing and return of an item associated with a user, in accordance with one or more embodiments.

FIG. 1 shows a system 100 for facilitating condition-based storing and return of an item associated with a user, in accordance with one or more embodiments. As shown in FIG. 1, system 100 may include server system 101, locker system 102, client device 104, database(s) 132, locker 105 (e.g., lockers 105a-105n), or other components. The locker system 102 may include item identification subsystem 112, item categorization subsystem 114, product/service subsystem 116, return condition subsystem 118, locking subsystem 120, user interface subsystem 122, or other components. By the way of example, locker system 102 may include a computer system and be a distributed system, a cloud-based system, or other systems. Client device 104 may include any type of mobile terminal, fixed terminal, or other device. By the way of example, client device 104 may include any computing device, such as a personal computer (PC), a laptop computer, a tablet computer, a hand-held computer, other computer equipment. Users may, for instance, utilize client device 104 to interact with server system 101, locker system 102, or other components of system 100.

A component of system 100 may communicate with one or more components of system 100 via a communication network 150 (e.g., Internet, a mobile phone network, a mobile voice or data network, a cable network, a public switched telephone network, or other types of communications networks or combinations of communications networks). The communication network 150 may be a wireless or wired network.

It should be noted that, while one or more operations are described herein as being performed by particular components of system 100, those operations may, in some embodiments, be performed by other components of system 100. As an example, while one or more operations are described herein as being performed by components of locker system 102, those operations may, in some embodiments, be performed by components of server system 101 or client device 104.

In some embodiments, system 100 facilitates condition-based storage and return of an associated with a user. System 100 includes a number of lockers 105 that may be used for storage of items. System 100 facilitates provision of a product or service to the user in connection with storage of the item in a locker 105. That is, the user may obtain a product or service (e.g., a loan, another item, or other product or service) using system 100 in connection with storing the item in locker 105. The item may be a physical item, such as a smartphone, tablet, jewelry, watch, art items, souvenir, or other items. In some embodiments, system 100 may restrict user access to the item at least until a first set of conditions is satisfied. System 100 may also accept the item for storage if a second set of conditions is satisfied. Furthermore, system 100 may determine the product or service to be presented to the user based on the item.

In some embodiments, system 100 activates a locking mechanism in response to an item being placed in system 100 to secure the item within system 100. The item may be placed by user 140 associated with the item or on behalf of user 140 (e.g., a representative associated with system 100). Subsequent to the activation of locking mechanism, system 100 may obtain attribute information indicating various attributes of the item (e.g., a weight, a shape, a size, a color, an identification code, a configuration, one or more feature vectors representing one or more portions of the item, or other attributes). In some embodiments, system 100 obtains the attribute information via one or more sensors of system 100 (e.g., an infrared sensor, a weight sensor, a density sensor, a volume sensor, a camera, a three-dimensional (3D) sensor, a radio-frequency (RF) sensor, or other sensors). For example, attribute information, such as size and shape, may be obtained or determined using data obtained from one or more infrared sensors. In another example, the shape of the item may be obtained via a 3D sensor. In another example, a color of the item may be obtained via a camera. In another example, a weight of the item may be obtained via a weight sensor. In another example, if the item is an electronic device, such as a smartphone, user 140 may be instructed by system 100 to place the item in locker 105 powered on, and system 100 may obtain a serial number or an International Mobile Equipment Identity (IMEI) from the item via a RF sensor using a protocol, such as Bluetooth, near field communication (NFC), or other protocols. In another example, a volume of the item may be obtained via a volume sensor. In another example, system 100 may capture one or more images of the item via a camera and perform image recognition on the images to determine one or more attributes of the item.

In some embodiments, system 100 processes the attribute information based on reference item information related to one or more reference items to determine a categorization of the item. The categorization may include a type of the item (e.g., a smartphone, a tablet, jewelry, watch, or other types), a value of the item (e.g., $50, $350, or other values), or other categorizations. In an example, system 100 may compare the attribute information of the item with reference item information (e.g., attribute information) of reference items stored in a database. In some embodiments, system 100 may maintain a catalog of reference items, including attribute information of the reference items, in the database. For example, for a reference item such as a smartphone, system 100 may store reference information, such as "product type=smartphone," "product name=eyePhone" "weight=94 grams," "size=5.94 inch*2.98 inch*0.33 inch," "color=black," "storage capacity=64 GB," "price=$749," one or more feature vectors or other representations of one or more portions of the smartphone, or other reference information. In another example, for a reference item such as a watch, system 100 may store reference information such as "product type=watch" "product name=Gag Heuer" "weight=30 grams," "size=2 inch*0.33 inch," "band=1 inch," "color=gold," "price=$500," one or more feature vectors or other representations of one or more portions of the watch, or other information. System 100 may compare the attribute information of the item with reference item information of the reference items in the database and determine the categorization of the item based on the comparison. For example, based on the attribute information and the reference item information, the categorization of the item may be determined as "smartphone" or "$600-$800." Further, in some embodiments, system 100 may also determine a physical or working condition of the item using one or more sensors. For example, if system 100 determines the item is a "smartphone" but has a cracked screen (e.g., based on pictures from the camera), then system 100 may determine the quantitative value as "$150" or other value, which may be lesser than the regular value of the "smartphone."

In some embodiments, in response to determining the categorization conditions are not satisfied, system 100 may deactivate the locking mechanism of system 100 to unlock system 100 and provide user access to the item. However, in response to determining the categorization of the item satisfies the categorization conditions, system 100 may provide product/service information related to a product or service for presentation to user 140. The product or service may include a loan, a specific item for rent or lease, or other products or services. In some embodiments, the product or service may be determined based on the categorization of the item. For example, if system 100 has determined the categorization of the item as "$150," system 100 may provide a loan product as a function of the categorization (e.g., up to the value of the item, a specified percentage above the value of the item, or other values) and present the product to the user.

Upon presenting the product/service information, user 140 may accept or reject the presented product or service. If user 140 rejects the product/service, system 100 may deactivate the locking mechanism of system 100 to unlock locker 105 to provide user access to the item. However, in response to receiving a user acceptance of the product/service, system 100 may proceed with assigning one or more item return conditions to the item. System 100 may restrict user access to the item at least until the item return condition is satisfied. The item is securely stored in system 100 until the item return condition is satisfied.

In some embodiments, system 100 may generate unlock information for unlocking locker 105 to retrieve the item and provide it to user 140. However, the unlock information may not be enabled or activated to unlock locker 105 until the item return condition is satisfied. The unlock information may include a username and password, a personal identification number ("PIN"), a code (e.g., a number having a series of digits or alphanumeric characters of a specified length such as a four-digit code), biometric data of user 140, such as a fingerprint, facial recognition data, iris recognition data, user profile data (e.g., name of user 140, social security number (SSN), telephone number, date of birth, or zip code) or other information.

In some embodiments, the unlock information may be generated based on attribute information of the item. As an example, one or more portions of the unlock information may be generated as a function of hashing one or more representations of one or more attributes of the item. In one use case, where the attributes of the item include "product type=watch" and "color=gold," at least part of the unlock information may include a hash of the string "watchgold" or other data derived from such hash. In a further use case, the string "watchgold" may be provided as an input to a one-way hash function (or other hash function) to obtain a bit string of fixed-length as the hash of the string "watchgold." In another use case, each of the attributes may be represented by a binary code or other code, and the attribute codes may be concatenated and fed as input to the hash function to obtain the corresponding hash output.

System 100 may monitor the item return condition and determine whether the item return condition is satisfied. In response to the user satisfying the item return condition, system 100 causes access rights (e.g., unlock information) to the item to be enabled for user 140. The user may provide the unlock information and access the item stored in locker 105. For example, the user may input the unlock information to system 100, and upon verifying that the item return condition is satisfied and the unlock information is correct, system 100 may deactivate the locking mechanism to unlock locker 105 to provide user access to the item.

Figure 2:
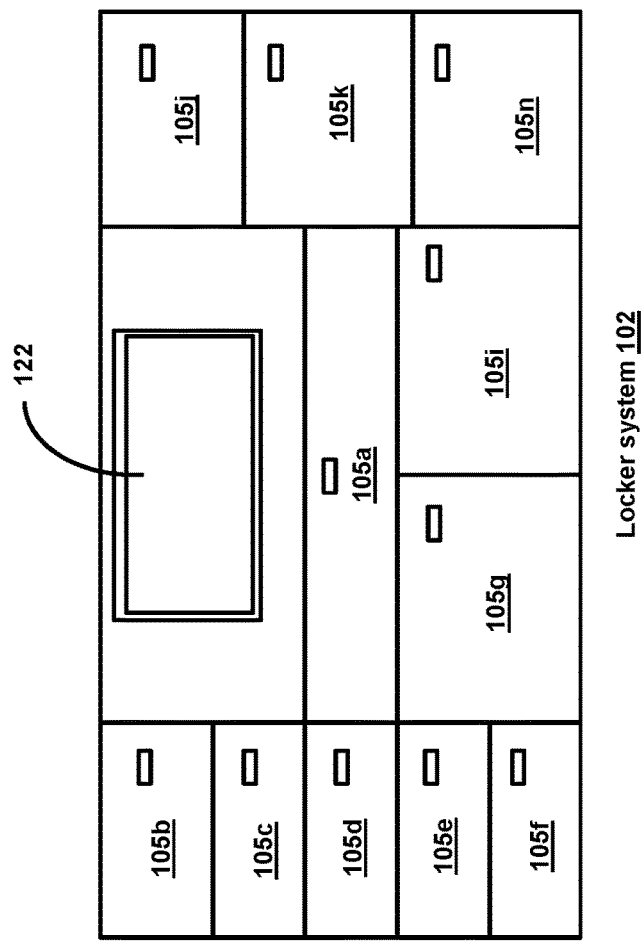
FIG. 2 shows a locker system of the system that facilitates condition-based storage and return of the item, in accordance with one or more embodiments.
Figure 3:
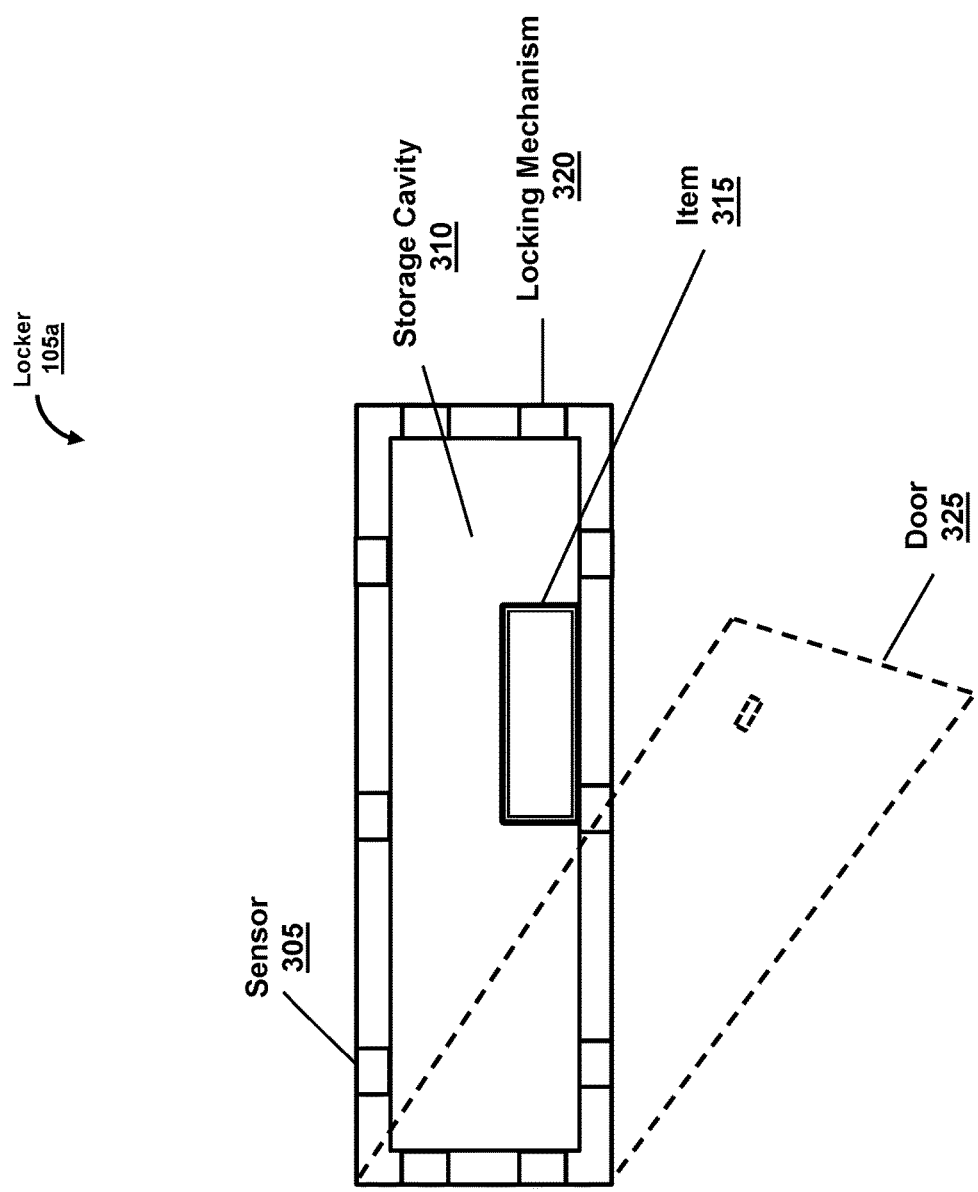
FIG. 3 shows a block diagram of locker of the locker system, in accordance with one or more embodiments.

FIG. 2 shows a locker system 102 of system 100 that facilitates condition-based storage and return of the item, in accordance with one or more embodiments. In some embodiments, locker system 102 includes a number of lockers 105 (e.g., lockers 105a-105n) that may be used for storage of an item. As an example, FIG. 3 shows a block diagram of locker 105a of locker system 102, in accordance with one or more embodiments. Locker 105a may be of any shape and size. For example, locker 105a may be cube shaped, cuboid-shaped, or other shapes. Locker 105a has a storage cavity 310 where item 315 may be placed or stored. Item 315 may be a physical item, such as a smartphone, tablet, jewelry, watch, art items, souvenir, or other items. Locker 105a may include one or more sensors, such as sensor(s) 305, which may be used to determine attribute information of item 315. The sensors may include an infrared sensor, a weight sensor, a density sensor, a volume sensor, a camera, a 3D sensor, an RF sensor, or other sensors. The sensors may be installed in locker 105a in various ways. As an example, sensors may be installed in the perimeter of the locker 105a as illustrated in FIG. 3. In some embodiments, the sensors are installed in a specific way so as to prevent the sensors from being tampered (e.g., by user 140), accidentally damaged during the placement of item 315, or from being adversely affected otherwise.

Locker 105a may also include locking mechanism 320 for locking locker 105a (e.g., to secure item 315). In some embodiments, locking mechanism 320 may be an electromechanical lock that may be controlled remotely, e.g., by locker system 102. For example, locker system 102 may activate locking mechanism 320 via network 150, thereby locking door 325 of locker 105a (e.g., to secure item 315). In another example, locker system 102 may deactivate locking mechanism 320, thereby unlocking door 325 of locker 105a (e.g., to provide user access to item 315).

In some embodiments, other lockers 105 in locker system 102 may be similar to locker 105a (e.g., all lockers 105 have sensors as illustrated in FIG. 3). In some embodiments, a subset of lockers 105 may have sensors (e.g., similar to locker 105a) and another subset of lockers 105 may not have the sensors. Further, item 315 may be initially placed in one locker and later moved to another locker for storage. For example, item 315 may be initially placed in a first locker that has one or more sensors, such as locker 105a (e.g., to determine the categorization of item 315 using the sensors) and later moved to another locker for storage, such as a locker that does not have sensors (e.g., upon the user accepting the product/service). In some embodiments, locker system 102 may move item 315 from one locker to another locker automatically and using a transfer mechanism, such as tubes, conveyor belts or other mechanisms interconnecting the lockers 105. In some embodiments, locker system 102 may notify a representative associated with the locker system 102 to move item 315 for locker 105a to another locker manually.

Different lockers in locker system 102 may be of different shapes or sizes. For example, locker 105a is of a first size, lockers 105b-105f are of a second size, lockers 105g-105i are of a third size and lockers 105j-105n are of a fourth size.

Locker system 102 includes a user interface subsystem 122, which may be used by user 140 to operate locker system 102. The user interface subsystem 122 includes an input component (e.g., keypad, keyboard, touchscreen device or other components) and output component (e.g., display, speakers) using which user 140 may interact with locker system 102. For example, user 140 may input, using user interface subsystem 122, a request for availing a product or service from locker system 102. User 140 may also create a user profile (e.g., name of user 140, SSN, telephone number, date of birth, address or zip code). User 140 may also interact with user interface subsystem 122 to satisfy the item return condition. For example, user 140 may repay a loan using locker system 102 by depositing cash into locker system 102. In some embodiments, locker system 102 may have the features and capabilities of an automated teller machine (ATM). In some embodiments, user 140 may satisfy the item return condition using any of a number of computer systems or ATMs at any location that is connected to locker system 102 over a communication network, in addition to or instead of at the locker system 102. However, user 140 may have to physically access locker system 102 to retrieve item 315 from locker 105a. It should be noted that, although locker system 102 is shown in FIG. 2 as a physical structure in a given location, locker system 102 may in some embodiments include one or more structures or devices in multiple locations (e.g., where one or more processing operations described herein with respect to an item stored in a locker are performed by a server system in the cloud or otherwise by devices in locations other than the location at which the item is located).

Subsystems 112-122

In some embodiments, item identification subsystem 112 may obtain attribute information of item 315. As described above, the attribute information may indicate various attributes of the item (e.g., a weight, a shape, a size, a color, an identification code, a configuration, one or more feature vectors representing one or more portions of the item, or other attributes). In some embodiments, item identification subsystem 112 obtains the attribute information via one or more sensors, such as sensor(s) 305. The sensor may include an infrared sensor, a weight sensor, a density sensor, a volume sensor, a camera, a 3D sensor, a RF sensor, or other sensors. For example, item identification subsystem 112 may obtain or determine attribute information such as a size and shape using data obtained from one or more infrared sensors. In another example, if the item is an electronic device, such as a smartphone, item identification subsystem 112 may obtain identification code, such as a serial number or IMEI of the item via RF sensor using Bluetooth, NFC, or other protocols. In another example, item identification subsystem 112 may capture one or more images of item 315 using the camera and use feature vectors extracted from the images to determine one or more attributes of the item. As an example, the feature vectors may represent attributes of an image (e.g., color, texture, spectral information, shape, edge, different patterns, etc.), where each feature vector is an n-dimensional vector of numerical features that represent some part of the image. In some embodiments, the values in each feature vector might correspond to the pixels of the image.

In some embodiments, item categorization subsystem 114 processes attribute information associated with item 315 to determine the categorization of item 315. As described above, the categorization of item 315 may include a type of the item (e.g., a smartphone, a tablet, jewelry, watch, or other types), a value of the item (e.g., $50, $350, or other values), or other categorizations. In an example, item categorization subsystem 114 may compare the attribute information of item 315 with reference item information (e.g., attribute information) of reference items stored in database 132 to determine the categorization. For example, item identification subsystem 112 may have obtained attribute information of item 315 (e.g., "weight=94 grams," "size=5.94 inch*2.98 inch*0.33 inch," etc.). Item categorization subsystem 114 may compare the attribute information with reference item information in database 132, and determine that the attribute information matches with reference item information associated with one or more reference items (e.g., "product type=smartphone," "product name=eyePhone" "weight=94 grams," "size=5.94 inch*2.98 inch*0.33 inch," "color=black," "storage capacity=64 GB," "price=$749," etc.). Accordingly, item categorization subsystem 114 may determine the categorization of item 315 as "smartphone" or "$749" (or other appropriate number or range).

In some embodiments, the categorization of item 315 may also be determined using feature vectors related to attributes of item 315. The item categorization subsystem 114 may compare the feature vectors (e.g., feature vectors related to attributes of item 315) extracted from one or more images of item 315 with feature vectors of the reference items stored in database 132 to determine a categorization of item 315 based on the matching feature vectors. For example, extracted feature vectors may include one or more feature vectors corresponding to a shape and other physical characteristics of item 315. The extracted feature vectors may be compared with feature vectors of the reference items and, based on the extracted feature vectors matching with the feature vectors of the reference item categorized as "smartphone," the type of item 315 may be determined as "smartphone."

In some embodiments, item categorization subsystem 114 may determine a confidence level in the categorization of item 315, which indicates a degree of accuracy in the determined category. The confidence level may have values in one of many formats. For example, the confidence level may be an enumerated list having four values—"low," "medium," "high" and "Very high" in which "low" indicates the lowest confidence level and "very high" indicates the highest confidence level. In another example, the confidence level may be expressed as a percentage (e.g., 95% or other percentage). As an example, the confidence level may be determined based on a match of a specific set of attributes of the item and the reference item. In one use case, the confidence level may be higher based on a greater number of matches between the corresponding attributes of the item and the reference item, and the confidence level may be lower based on a lower number of matches between the corresponding attributes of the item and the reference item.

Item categorization subsystem 114 may determine if the categorization of the item satisfies one or more categorization conditions. In some embodiments, item categorization subsystem 114 may determine if one or more categorization conditions are satisfied based on item type, value or other categorizations. For example, if item type categorization of item 315 is "shoes" and categorization condition states that accepted item types are "smartphone," "tablet," "jewelry," or "watch," then item categorization subsystem 114 may determine the item type categorization "shoes" does not satisfy the categorization condition. However, if the item type is "smartphone," item categorization subsystem 114 may determine the item type categorization "shoes" as satisfying the categorization condition. In another example, if item 315 is of value "$25" and categorization condition states that accepted items are of value range "$100<value<$1000," then item categorization subsystem 114 may determine that the value categorization of item does not satisfy the categorization condition. However, if the item value is "$150," item categorization subsystem 114 may determine the item value categorization "$150" as satisfying the categorization condition. In another example, if the confidence level does not exceed a confidence level threshold (e.g., "medium," "90%," or other thresholds), item categorization subsystem 114 may determine the categorization condition is not satisfied regardless of whether the item type or value satisfies the categorization conditions. However, if the confidence level exceeds the confidence level threshold, item categorization subsystem 114 may confirm the categorization of the item as satisfying the categorization conditions.

In some embodiments, responsive to a determination that the confidence level is below the confidence level threshold, item categorization subsystem 114 may notify an associate (e.g., a representative associated with locker system 102) to determine the categorization of item 315. Further, item categorization subsystem 114 may also provide a video feed of item 315 to the associate. For example, the associate may view an actual video feed, virtual reality-based video feed, augmented reality-based video feed, or other video feeds of item 315 to determine the categorization.

In some embodiments, in response to determining the categorization conditions are not satisfied, item categorization subsystem 114 may notify locking subsystem 120 to deactivate locking mechanism 320 to unlock locker 105*a* and provide user 140 access to item 315. In response to determining the categorization of the item satisfies the categorization conditions (e.g., item type "smartphone" is one of the accepted item types for storage, item value of "$150" is within a value range, or confidence level is "high"), item categorization subsystem 114 may notify product/service subsystem 116 to provide product/service information related to a product or service for presentation to user 140.

The product or service may include a loan, a specific item for rent or lease, or other products or services. In some embodiments, product/service subsystem 116 may determine the product or service based on the categorization of the item. For example, if item categorization subsystem 114 has determined the categorization of the item is "$150," product/service subsystem 116 may provide a loan product as a function of the categorization (e.g., up to the value of the item, a specified percentage above or below the value of the item, or other values). Furthermore, different products or services may be presented for satisfying different categorization conditions. For example, if a first categorization condition such as item type of "smartphone" being one of the accepted item types and the item value of "$150" being in the accepted value range is satisfied, item categorization subsystem 114 may present product or service information of a first product or service. In another example, if a second categorization condition such as the item value of "$900" being in the accepted value range is satisfied, item categorization subsystem 114 may present product or service information of a second product or service.

In some embodiments, product/service subsystem 116 may be configured with pre-defined criteria (e.g., by a representative associated with locker system 102) for determining products or services to be presented for different categorizations. After determining the product or service, product/service subsystem 116 may present the product/service information related to a product or service to user 140 via user interface subsystem 122.

If user 140 rejects the product/service, product/service subsystem 116 may notify locking subsystem to deactivate locking mechanism 320 to unlock locker 105*a* to provide user 140 access to item 315. In response to receiving a user acceptance of the product/service, product/service subsystem 116 may notify return condition subsystem 118 to assign one or more item return conditions to the item.

In some embodiments, return condition subsystem 118 may assign one or more item return conditions to item 315 upon receiving user acceptance of the product or service. As an example, where the user accepted a loan product or service, the item return conditions may specify a repayment loan amount, a repayment period, payment of any late fees or other fees, or other conditions that user 140 may have to satisfy to obtain access to item 315. As another example, where the user accepted rental of a specific item, the item return conditions may specify return of the rented item, payment of any late fees or other fees, or other conditions. In some embodiments, return condition subsystem 118 may be configured with pre-defined criteria (e.g., by a representative associated with locker system 102) for determining item return conditions for different categorizations. In some embodiments, return condition subsystem 118 may restrict user access to item 315 at least until the item return condition is satisfied.

Further, in some embodiments, return condition subsystem 118 may also generate unlock information, which user 140 may use upon satisfying the item return condition for unlocking locker 105*a* to retrieve item 315. As described above, the unlock information may include a username and password, a PIN or other code (e.g., a number or alphanumeric characters of a specified length), biometric data of user 140 (e.g., a fingerprint, facial recognition data, iris recognition data), user profile data (e.g., name of user 140, social security number (SSN), telephone number, date of birth, or zip code), or other information. In some embodiments, return condition subsystem 118 may generate the unlock information, such as a code, based on attribute information of the item.

In some embodiments, locking subsystem 120 controls locking mechanism 320 to lock or unlock lockers 105. For example, locking subsystem 120 may activate locking mechanism 320 to lock locker 105*a* or maintain activation of locking mechanism 320 in response to one or more conditions, such as item 315 being placed in locker 105*a* and door 325 being shut or categorization of item satisfying one or more categorization conditions. In another example, locking subsystem 120 may deactivate locking mechanism to unlock locker 105 in response to one or more conditions, such as categorization of item 315 not satisfying one or more categorization conditions, user rejecting a product or service, receiving unlock information from user upon the user satisfying the item return condition, or other conditions. In some embodiments, locking subsystem 120 may send activation or deactivation command to the locking mechanism 320 over communication network 150.

In some embodiments, the user interface subsystem 122 may be used by user 140 to operate locker system 102. For example, user 140 may input, using user interface subsystem 122, a request for availing a product or service from locker system 102. The user interface subsystem 122 may also display various information to user 140 (e.g., instructions for placing item 315 in locker 105*a*, information regarding the product or service, information regarding the return condition, or other information). The user interface subsystem 122 may also enable user 140 to create a user profile (e.g., name of user 140, SSN, telephone number, date of birth, address or zip code). User 140 may also interact with user interface subsystem 122 to retrieve the item from locker 105*a*. For example, user 140 may input unlock information using the user interface subsystem 122 to unlock locker 105*a*. Upon verifying that the user has satisfied the item return condition and the unlock information is correct, locker 105*a* may be unlocked to provided user access to item 315.

In some embodiments, database(s) 132 stores a variety of information that may be used to operate locker system 102.

As an example, database 132 may store user profile data (e.g., name of user 140, SSN, telephone number, date of birth, address, user preferences, user bank account information, or other information). In another example, database 132 may store reference item information of reference items that may be used in determining a categorization of an item associated with a user.

Example Flowcharts

Figure 4:
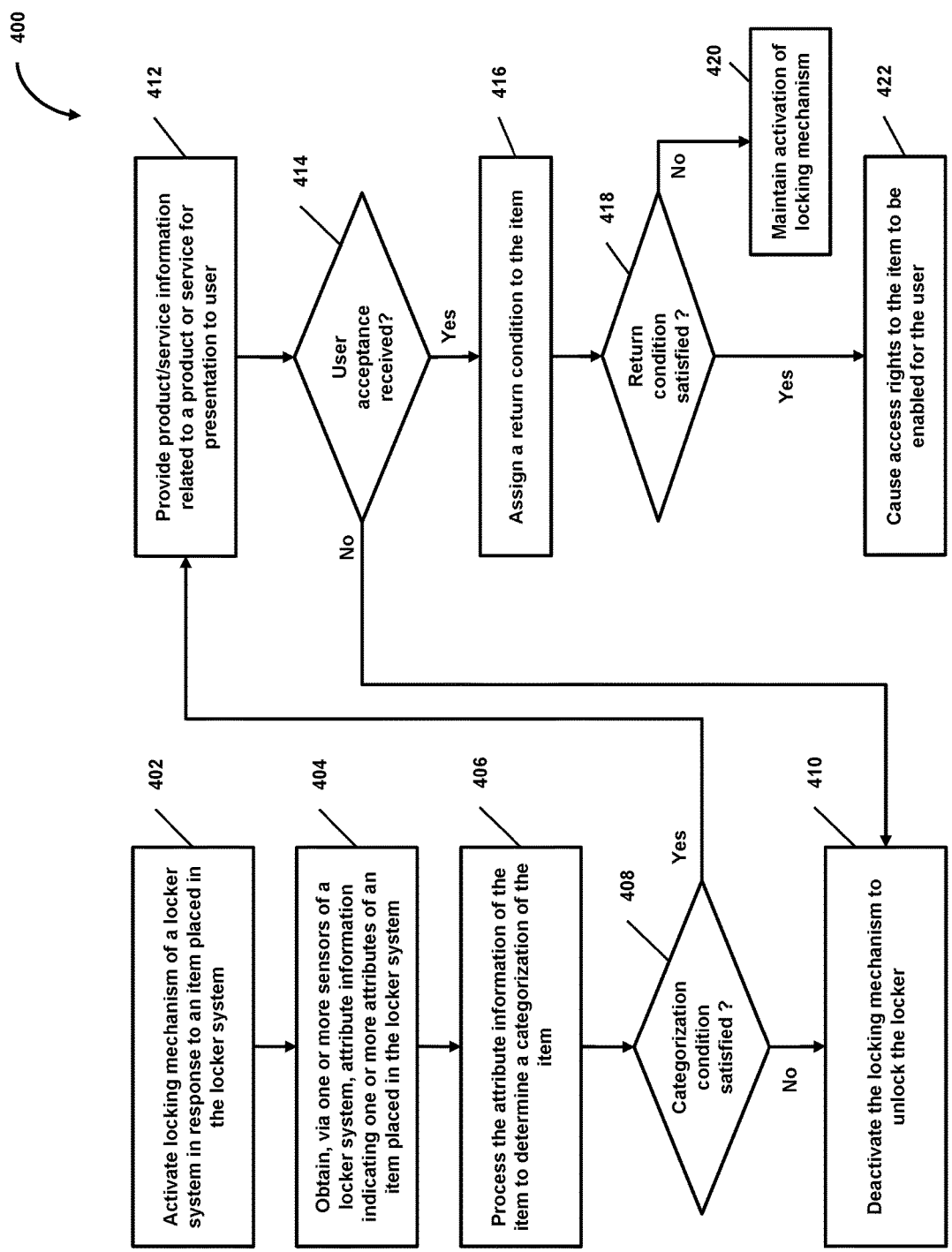
FIG. 4 shows a flowchart of a method for facilitating condition-based storage and return of an item, in accordance with one or more embodiments.
Figure 5:
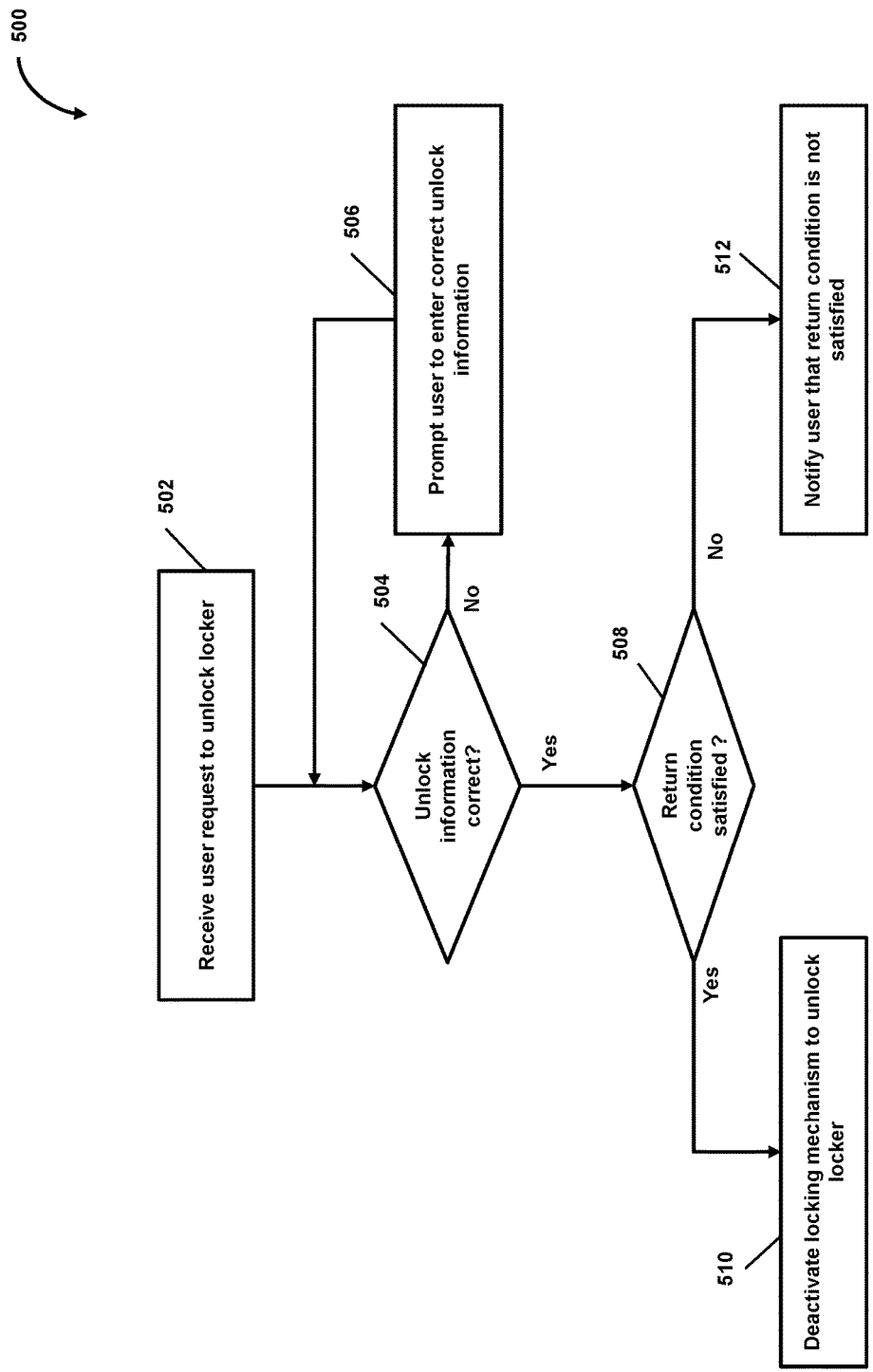
FIG. 5 shows a flowchart of a method for facilitating returning of an item stored in a locker system, in accordance with one or more embodiments.

FIGS. 4 and 5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for facilitating condition-based storage and return of an item, in accordance with one or more embodiments. User 140 may use locker system 102 for availing a product or service in connection with storing item 315 associated with user 140 in locker 105a of locker system 102. As an example, item 315 may be a physical item, such as a smartphone, tablet, jewelry, watch, art items, souvenir, or other items. Item 315 may be placed in locker 105a by user 140 or on behalf of user 140 (e.g., by a representative associated with locker system 102). In an operation 402, locking mechanism 320 is activated in response to item 315 being placed in the locker 105a. In some embodiments, activation of locking mechanism 320 causes door 325 of locker 105a to be locked, thereby securing item 315 in locker 105a. Access to item 315 may be restricted until locking mechanism 320 is deactivated. Operation 402 may be performed by a subsystem that is the same as or similar to locking subsystem 120, in accordance with one or more embodiments.

In an operation 404, attribute information indicating one or more attributes of item 315 is obtained. As described above, attribute information indicates various attributes of the item (e.g., a weight, a shape, a size, a color, an identification code, a configuration, or other attributes). In some embodiments, the attribute information is obtained via sensor(s) 305. The sensor may include an infrared sensor, a weight sensor, a density sensor, a volume sensor, a camera, a 3D sensor, a RF sensor, or other sensors. As an example, one or more images of item 315 may be captured using the camera and feature vectors related to the attributes of item 315 may be extracted and processed to determine the attribute information. Operation 404 may be performed by a subsystem that is the same as or similar to item identification subsystem 112, in accordance with one or more embodiments.

In an operation 406, the attribute information is processed to determine the categorization of item 315. As an example, the categorization of item 315 may include a type of the item (e.g., a smartphone, a tablet, jewelry, watch, or other types), a value of the item (e.g., $50, $350, or other values), or other categorizations. In some embodiments, the categorization of item 315 may be determined using any of a number of methods. In an example, the attribute information of item 315 may be compared with reference item information (e.g., attribute information) of reference items stored in database 132 to determine the categorization. For example, attribute information of item 315 obtained from operation 404 may include "weight=94 grams," "size=5.94 inch*2.98 inch*0.33 inch" and one or more images of item 315. The attribute information of item 315 may be compared with reference item information in database 132, and determined that the attribute information matches with reference item information having one or more images of a reference item and other attribute information such as "product type=smartphone," "product name=eyePhone" "weight=94 grams," "size=5.94 inch*2.98 inch*0.33 inch," "color=black," "storage capacity=64 GB," "price=$749." Accordingly, the categorization of item 315 may be determined as "smartphone" or "$749." In another example, feature vectors related to attributes of item 315 may be compared with feature vectors of the reference items stored in database 132 to determine a categorization of item 315. Operation 406 may be performed by a system that is the same as or similar to item categorization subsystem 114, in accordance with one or more embodiments.

In an operation 408, a determination is made whether the categorization of item 315 satisfies one or more categorization conditions. In some embodiments, the categorization conditions may be based on an item type, a value of the item or other categorizations. For example, if item type categorization of item 315 is "shoes" and categorization condition states that accepted item types are "smartphone," "tablet," "jewelry," or "watch," then a determination may be made that the item type categorization "shoes" does not satisfy the categorization condition. In another example, if the item type does not match any reference item types of reference items, then a determination may be made that the categorization does not satisfy one or more categorization conditions. In another example, if item 315 is of value "$25" and categorization condition states that value of accepted items is in the value range "$100<value<$1000," then it may be determined that the value categorization of item does not satisfy the categorization condition. In another example, if item 315 is of value "$150" and categorization condition states that value of accepted items is in the value range "$100<value<$1000," then it may be determined that the value categorization of item satisfies the categorization condition. Operation 408 may be performed by a subsystem that is the same as or similar to item categorization subsystem 114, in accordance with one or more embodiments.

In an operation 410, responsive to a determination that the categorization conditions are not satisfied, locking mechanism 320 of locker 105a may be deactivated to unlock door 325 of locker 105a to provide user 140 access to item 315. Operation 410 may be performed by a subsystem that is the same as or similar to locking subsystem 120, in accordance with one or more embodiments.

In response to determining the categorization of the item satisfies the categorization conditions, in operation 412, product/service information related to a product or service may be presented to user 140. Further, during the presentation of the product/service information to the user, the activation of the locking mechanism is maintained in response to the categorization of the item satisfying one or more categorization conditions. Examples of a product or service may include a loan, a specific item for rent or lease, or other products or services. In some embodiments, the product or service may be determined based on the categorization of item 315. For example, if the categorization of item 315 is determined as "$150," a product or service, such as a loan, may be determined as a function of the categorization (e.g., up to the value of the item, a specified percentage above or below the value of the item, or other values). In some embodiments, pre-defined criteria (e.g., defined by a representative associated with locker system 102) may be used to determine products or services to be presented for different categorizations. Operation 412 may be performed by a subsystem that is the same as or similar to product/service subsystem 116, in accordance with one or more embodiments.

In operation 414, a determination is made whether user 140 accepted the product or service. In some embodiments, user 140 may provide user input indicating acceptance or rejection of the product or service using user interface subsystem 122. If a user rejection of the product/service is received, locking subsystem 120 may be notified to deactivate locking mechanism 320 to unlock door 325 of locker 105a to provide user 140 access to item 315. Operation 412 may be performed by a subsystem that is the same as or similar to product/service subsystem 116, in accordance with one or more embodiments.

In response to receiving a user acceptance of the product/service, in operation 416, a return condition is assigned to item 315. As an example, where the user accepted a loan product or service, the item return conditions may specify a repayment loan amount, a repayment period, payment of any late fees or other fees, or other conditions that user 140 may have to satisfy to obtain access to item 315. As another example, where the user accepted rental of a specific item, the item return conditions may specify return of the rented item, payment of any late fees or other fees, or other conditions. In some embodiments, item return conditions may be determined using pre-defined criteria (e.g., by a representative associated with locker system 102) for different categorizations. Operation 414 may be performed by a subsystem that is the same as or similar to return condition subsystem 118, in accordance with one or more embodiments.

In operation 418, a determination is made whether the item return condition is satisfied. In response to determining that the item return condition is not satisfied, in operation 420, the activation of locking mechanism 320 is maintained to keep item 315 locked in locker 105a. In response to determining that the item return condition is satisfied, in operation 422, access rights (e.g., unlock information) to item 315 is enabled using which user 140 may access item 315 in locker 105a. As described above, the unlock information may include a username and password, a PIN or other code, biometric data of user 140, user profile data, or other information. While the unlock information may be generated at any time during storage of item 315, it may be activated (e.g., enabled) upon user 140 satisfying the item return condition. That is, in some embodiments, unlock information may not be used to unlock locker 105a unless it is activated. Operations 418-422 may be performed by a subsystem that is the same as or similar to return condition subsystem 118, in accordance with one or more embodiments.

FIG. 5 shows a flowchart of a method 500 for facilitating returning of an item stored in a locker system, in accordance with one or more embodiments. In operation 502, a user request is received to unlock locker 105a. Operation 502 may be performed by a subsystem that is the same as or similar to return condition subsystem 118, in accordance with one or more embodiments.

In operation 504, a determination is made whether the unlock information is valid. For example, a determination is made whether user 140 entered unlock information, such as a code, correctly. Operation 504 may be performed by a subsystem that is the same as or similar to return condition subsystem 118, in accordance with one or more embodiments.

If the unlock information input is invalid, in operation 506, user is prompted to re-enter the unlock information. Operation 506 may be performed by a subsystem that is the same as or similar to return condition subsystem 118, in accordance with one or more embodiments.

If the unlock information is valid, in operation 508, a determination is made whether the item return condition is satisfied (or the unlock information is activated). Operation 508 may be performed by a subsystem that is the same as or similar to return condition subsystem 118, in accordance with one or more embodiments.

In response to a determination that the item return condition is satisfied (or the unlock information is activated), in operation 510, locking mechanism 320 is deactivated to unlock door 325 of locker 105a to provide user 140 access to item 315 in locker 105a. Operation 510 may be performed by a subsystem that is the same as or similar to locking subsystem 120, in accordance with one or more embodiments.

On the other hand, in response to a determination that the item return condition is not satisfied (or the unlock information is not activated), in operation 512, user 140 is notified that the item return condition is not satisfied (or the unlock information is not activated). Operation 512 may be performed by a subsystem that is the same as or similar to return condition subsystem 118, in accordance with one or more embodiments.

In some embodiments, the various computers and subsystems illustrated in FIG. 1 may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of locker system 102 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-122 described herein is for illustrative purposes, and is not intended to be limiting, as any of subsystems 112-122 may provide more or less functionality than is described. For example, one or more of subsystems 112-122 may be eliminated, and some or all of its functionality may be provided by other ones of subsystems 112-122. As another example, additional subsystems may be programmed to perform some, or all of the functionality attributed herein to one of subsystems 112-122.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

1. A method comprising: obtaining, via a locker system, attribute information indicating one or more attributes of an item placed in the locker system; processing the attribute information of the item to determine a categorization of the item; providing product/service information related to a product or service for presentation to the user in response to the categorization; assigning an item return condition; and causing access rights to the item to be enabled for the user in response to the user satisfying the item return condition 2. The method of embodiment 1, wherein obtaining the attribute information further includes in response to the item being placed in the locker system, causing activation of a locking mechanism of the locker system to secure the item within the locker system.

3. The method of embodiments 1-2 further includes maintaining, during the presentation of the product/service information to the user, the activation of the locking mechanism in response to the categorization of the item satisfying one or more categorization conditions.

4. The method of any of embodiments 1-3, wherein determining the categorization includes determining whether the categorization of the item satisfies one or more categorization conditions.

5. The method of any of embodiments 1-4, wherein determining the categorization includes determining an item type as the categorization of the item.

6. The method of embodiment 5, wherein determining whether the categorization satisfies one or more categorization includes determining the categorization satisfies one or more categorization based on the item type matching a reference item type of one or more reference items that is accepted for storage.

7. The method of any of embodiments 1-4, wherein determining the categorization includes determining a quantitative value of the item as the categorization of the item.

8. The method of embodiment 7, wherein determining whether the categorization satisfies one or more categorization includes determining the categorization satisfies one or more categorization based on the quantitative value of the item being in a specified value range.

9. The method of any of embodiments 1-8 further comprising: deactivating a locking mechanism of the locker system to unlock the locker system in response to the categorization of the item not satisfying one or more categorization conditions.

10. The method of any of embodiments 1-9 further comprising: deactivating a locking mechanism of the locker system to unlock the locker system in response to receiving user rejection of the product or service.

11. The method of any of embodiments 1-10, wherein the attribute information is obtained via one or more sensors of the locker system, and the one or more sensors includes a weight sensor, a volume sensor, an infrared sensor, a camera, a three-dimensional sensor, or a radio-frequency sensor.

12. The method of any of embodiments 1-11, wherein the one or more attributes includes a shape, a size, a color, a weight, a volume, a density, a configuration, or an identification code of the item.

13. The method of any of embodiments 1-12 further comprising: obtaining reference information of a reference item from a storage system; and determining the categorization of the item based on the one or more attributes matching the reference information of the reference item.

14. The method of any of embodiments 1-13, wherein providing the product/service information includes: providing first product/service information of a first product/service in response to the categorization satisfying a first categorization condition, and providing second product/service information of a second product/service in response to the categorization satisfying a second categorization condition.

15. The method of any of embodiments 1-14, wherein determining the categorization of the item includes: determining a confidence level in the categorization of the item; determining whether the confidence level satisfies a confidence threshold; and confirming the categorization of the item based a determination that the confidence level satisfies the confidence threshold.

16. The method of any of embodiments 1-15 further comprising: generating unlock information based on the one or more attributes of the item, wherein the unlock information enables the user to deactivate a locking mechanism of the locker system to gain access to the item upon the item return condition being satisfied; and providing the unlock information to the user.

17. The method of any of embodiments 1-16, wherein the unlock information is generated based on the one or more attributes of the item.

18. The method of any of embodiments 1-17, wherein the unlock information includes one or more of a password, a PIN, a code of a specified length, biometric data of the user, or at least a portion of user profile data.

19. The method of any of embodiments 1-18, further comprising: receiving unlock information from the user for unlocking the locker system; and causing deactivation of a locking mechanism of the locker system to provide user access to the item in response to (i) receiving the unlock information and (ii) the user satisfying the item return condition.

20. A tangible, non-transitory, machine-readable medium storing instructions that, when executed by a data processing apparatus, cause the data processing apparatus to perform operations comprising those of any of embodiments 1-19.

21. A system comprising: one or more processors; and memory storing instructions that, when executed by the processors, cause the processors to effectuate operations comprising those of any of embodiments 1-20.

What is claimed is:

1. A locker system for condition-based storing and return of one or more items, the locker system comprising:
   one or more processors programmed with computer program instructions that, when executed, cause the locker system to:
      in response to a physical item associated with a user being placed in the locker system, cause activation of a locking mechanism of the locker system to secure the physical item within the locker system;
      extract, from images obtained via one or more sensors of the locker system, feature vectors related to physical attributes of the physical item subsequent to the activation of the locking mechanism;
      process the feature vectors related to the physical item based on reference feature vectors related to one or more reference items to determine a categorization of the physical item;
      in response to the categorization of the physical item satisfying one or more categorization conditions, (i) maintain the activation of the locking mechanism and (ii) provide product/service information related to a product or service for presentation to the user;
      assign one or more item return conditions to the physical item in response to receiving user acceptance of the product or service; and
      cause access rights to the physical item in the locker system to be enabled for the user in response to the user satisfying the one or more item return conditions.

2. The locker system of claim 1, wherein determining the categorization of the physical item comprises determining an item type of the physical item based on (i) the feature vectors and (ii) the reference feature vectors, and
   wherein the one or more processors are caused to determine whether the categorization of the physical item satisfies the one or more categorization conditions by determining whether the item type of the physical item matches a reference item type of the one or more reference items.

3. The locker system of claim 1, wherein determining the categorization of the physical item comprises determining a quantitative value of the physical item based on (i) the feature vectors and (ii) the reference feature vectors, and
   wherein the one or more processors are caused to determine whether the categorization of the physical item satisfies the one or more categorization conditions by determining whether the quantitative value of the physical item satisfies a value range condition.

4. The locker system of claim 1, wherein the one or more processors is caused to:
   receive unlock information from the user, and
   deactivate the locking mechanism of the locker system to provide user access to the physical item in response to (i) receiving the unlock information and (i) the user satisfying the one or more item return conditions.

5. A method implemented by one or more processors executing computer program instructions that, when executed, perform the method, the method comprising:
   obtaining, via one or more sensors of a locker system, feature vectors related to one or more attributes of an item placed in the locker system by or behalf of a user;
   processing the feature vectors related to the item to determine a categorization of the item;
   providing product/service information related to a product or service for presentation to the user in response to the categorization of the item satisfying one or more categorization conditions;
   assigning an item return condition to the item in response to receiving user acceptance of the product or service; and
   causing access rights to the item to be enabled for the user in response to the user satisfying the item return condition.

6. The method of claim 5, further comprising:
   in response to the item being placed on a portion of the locker system, causing activation of a locking mechanism of the locker system to secure the item within the locker system,
   wherein obtaining the feature vectors comprises extracting the feature vectors from images of the item placed in the locker system that are obtained via the one or more sensors.

7. The method of claim 6, further comprising:
   maintaining, during the presentation of the product/service information to the user, the activation of the locking mechanism in response to the categorization of the item satisfying the one or more categorization conditions.

8. The method of claim 5 further comprising:
   deactivating a locking mechanism of the locker system to unlock the locker system in response to (i) receiving user rejection of the product or service or (ii) the categorization of the item not satisfying the one or more categorization conditions.

9. The method of claim 5, wherein determining the categorization of the item includes: determining a quantitative value of the item based on (i) the feature vectors and (ii) reference feature vectors related to a reference item, and
   wherein determining whether the categorization of the item satisfies the one or more categorization conditions includes: determining whether the quantitative value of the item satisfies a value range condition.

10. The method of claim 5, wherein determining the categorization of the item includes: determining an item type of the item based on (i) the feature vectors and (ii) reference feature vectors related to a reference item, and
wherein determining whether the categorization of the item satisfies the one or more categorization conditions includes determining whether the item type of the item matches a reference item type of the reference item.

11. The method of claim 5, wherein obtaining the feature vectors includes obtaining the feature vectors via a volume sensor, an infrared sensor, a camera, or a three-dimensional sensor.

12. The method of claim 5, wherein the one or more attributes includes a shape, a size, a color, a weight, a volume, a density, a configuration, or an identification code.

13. The method of claim 5 further comprising:
obtaining reference information of a reference item from a storage system; and
determining the categorization of the item based on the one or more attributes matching the reference information of the reference item.

14. The method of claim 5, wherein providing the product/service information includes:
providing first product/service information of a first product/service in response to the categorization satisfying a first condition of the one or more categorization conditions, and
providing second product/service information of a second product/service in response to the categorization satisfying a second condition of the one or more categorization conditions, wherein the first product/service is different from the second product/service.

15. The method of claim 5, wherein determining the categorization of the item includes:
determining a confidence level in the categorization of the item;
determining whether the confidence level satisfies a confidence threshold; and
confirming the categorization of the item based a determination that the confidence level satisfies the confidence threshold.

16. The method of claim 5, further comprising:
generating unlock information based on the one or more attributes of the item, wherein the unlock information enables the user to deactivate a locking mechanism of the locker system to gain access to the item upon the item return condition being satisfied; and
providing the unlock information to the user.

17. The method of claim 5, further comprising:
receiving unlock information from the user for unlocking the locker system; and
causing deactivation of a locking mechanism of the locker system to provide user access to the item in response to (i) receiving the unlock information and (ii) the user satisfying the item return condition.

18. A non-transitory computer-readable medium storing instructions that, when executed by one or more processors, cause operations to be implemented on a computer system, the operations comprising:
obtaining, via one or more sensors of a locker system, attribute information indicating one or more attributes of an item placed in the locker system by or behalf of a user;
processing the attribute information of the item to determine a categorization of the item;
providing product/service information related to a product or service for presentation to the user in response to the categorization of the item;
assigning an item return condition to the item in response to receiving user acceptance of the product or service; and
causing access rights to the item to be enabled for the user in response to the user satisfying the item return condition.

19. The computer-readable medium of claim 18, wherein the categorization of the item is determined based on a type of the item, and wherein the one or more categorization conditions includes one or more types of the item accepted for storage by the locker system.

20. The computer-readable medium of claim 18, the operations further comprising:
receiving unlock information from the user for unlocking the locker system; and
causing deactivation of a locking mechanism of the locker system to provide user access to the item in response to (i) receiving the unlock information and (ii) the user satisfying the item return condition.

* * * * *